(12) United States Patent
Park

(10) Patent No.: US 11,994,378 B2
(45) Date of Patent: May 28, 2024

(54) CAMERA MODULE

(71) Applicant: LG INNOTEK CO., LTD., Seoul (KR)

(72) Inventor: Kang Yeol Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 197 days.

(21) Appl. No.: 17/595,898

(22) PCT Filed: May 28, 2020

(86) PCT No.: PCT/KR2020/006923
§ 371 (c)(1),
(2) Date: Nov. 29, 2021

(87) PCT Pub. No.: WO2020/242223
PCT Pub. Date: Dec. 3, 2020

(65) Prior Publication Data
US 2022/0236052 A1 Jul. 28, 2022

(30) Foreign Application Priority Data

May 29, 2019 (KR) .......................... 10-2019-0063221

(51) Int. Cl.
G01B 11/25 (2006.01)
(52) U.S. Cl.
CPC .................... G01B 11/25 (2013.01)
(58) Field of Classification Search
CPC ...................................................... G01B 11/25
USPC ......................................................... 248/136
See application file for complete search history.

(56) References Cited

U.S. PATENT DOCUMENTS

2016/0379370 A1* 12/2016 Nakazato ................ G06T 7/13
382/103
2017/0214901 A1* 7/2017 Zhao ..................... H04N 13/254
2019/0323832 A1* 10/2019 Natori ................ G01B 11/2513

FOREIGN PATENT DOCUMENTS

| KR | 10-2017-0134212 A | 12/2017 | |
| KR | 10-2019-0000052 A | 1/2019 | |
| KR | 1020190000052 | * 1/2019 | ........... G01S 7/4814 |
| KR | 10-2019-0014977 A | 2/2019 | |

(Continued)

OTHER PUBLICATIONS

International Search Report dated Aug. 26, 2020 in International Application No. PCT/KR2020/006923.

*Primary Examiner* — Frantz B Jean
(74) *Attorney, Agent, or Firm* — Saliwanchik, Lloyd & Eisenschenk

(57) ABSTRACT

A camera module, according to an embodiment of the present invention, comprises: a light emitting unit for outputting an optical signal to an object; a light receiving unit for receiving the optical signal reflected from the object; and a control unit for controlling the light emitting unit such that the optical signal selectively has one optical pattern from among a surface light source pattern and a point light source pattern. The light emitting unit comprises: a light emitting element array on which a plurality of light emitting elements are arranged in accordance with a predetermined arrangement pattern; and a lens module for transmitting the optical signal output by the light emitting element array, wherein the lens module includes an optical element which duplicates the optical signal output by the light emitting element array.

14 Claims, 13 Drawing Sheets

(56) References Cited

FOREIGN PATENT DOCUMENTS

| KR | 10-2019-0052544 A | | 5/2019 | |
|----|------|---|------|------|
| KR | 1020190052544 | * | 5/2019 | ........... G03B 21/142 |

* cited by examiner (a)        (b)

CAMERA MODULE

CROSS-REFERENCE TO RELATED APPLICATIONS

This application is the U.S. national stage application of International Patent Application No. PCT/KR2020/006923, filed May 28, 2020, which claims the benefit under 35 U.S.C. § 119 of Korean Application No. 10-2019-0063221, filed May 29, 2019, the disclosures of each of which are incorporated herein by reference in their entirety.

TECHNICAL FIELD

The present invention relates to a camera module.

BACKGROUND ART

Three-dimensional content is applied to various fields such as education, manufacturing, automatic driving, and the like in addition to the fields of game and culture. In order to obtain the three-dimensional content, a depth map is required. The depth map is a map showing a spatial distance and shows perspective information of one point with respect to another point in a two-dimensional image. A method of projecting infrared (IR) structured light to an object, a method of using a stereo camera, a time of flight (TOF) method, or the like is used as a method of obtaining the depth map.

In the case of the TOF method or the structured light method, light in an infrared wavelength range is used, and recently, there has been an attempt to use a feature of the infrared wavelength range for biometric identification. For example, it is known that a shape of veins spread in a back of a finger does not change during a person's lifetime from a time when the person is a fetus. Accordingly, a vein pattern may be recognized using a camera device in which an IR light source is installed. To this end, after an image of fingers is captured, a background is removed from the image on the basis of a color and a shape of the fingers to detect the fingers, and a vein pattern of the fingers may be extracted from color information of the detected fingers. That is, an average color of the figures, a color of veins spread in the figures, and a color of wrinkles on the figures may be different from each other. For example, a red color of the veins spread in the figures may be paler than an average color of the figures, and a color of the wrinkles on the figures may be darker than the average color of the figures. An approximate value for the veins for each pixel may be calculated using these features, and a vein pattern may be extracted using a calculated result. In addition, individuals may be identified by comparing the extracted vein pattern of the fingers and preregistered data.

However, since a light pattern for generating an IR image and a light pattern of a projector which outputs structured light are different from each other, different light modules should be installed, and thus there is a problem of increasing a volume of a camera device.

In addition, in the case of an IR image for recognizing finger veins or the like, a back of a finger approaches a camera device, and an image thereof is captured. When light, of which an intensity is equal to an intensity of a structured light projector, is emitted, there is a problem in that an image is not captured due to occurrence of a light-saturation phenomenon.

Technical Problem

The present invention is directed to providing a camera device in which a light source for capturing an infrared image and a structured light projector are coupled as one module.

The present invention is directed to providing a camera device capable of inhibiting a light-saturation phenomenon by adjusting an intensity of light when capturing an infrared image.

Objectives that should be solved according to embodiments are not limited to the above-described objectives and may include objectives or effects which may be recognized from the technical solution or modes of the invention described below.

Technical Solution

One aspect of the present invention provides a camera module including a light emitting unit which outputs optical signals to an object, a light receiving unit which receives optical signals reflected by the object, and a control unit which controls the light emitting unit so that the optical signals selectively have one optical pattern of a surface light pattern and a point light pattern, wherein the light emitting unit includes a light emitting element array in which a plurality of light emitting elements are disposed according to a predetermined arrangement pattern and a lens module which allows the optical signals output by the light emitting element array to pass therethrough, and the lens module includes an optical element which duplicates the optical signal output by the light emitting element array.

The light emitting unit may change an optical pattern of the optical signals by changing a distance between the light emitting element array and the lens module.

The control unit may drive some of the plurality of light emitting elements or all of the plurality of light emitting elements.

In the light emitting element array, the plurality of light emitting elements may be disposed to be spaced apart from each other at the same intervals.

The control unit may control the light emitting unit so that the light emitting elements, which are disposed to be spaced apart from each other at preset intervals, among the plurality of light emitting elements, emit light.

In the light emitting unit, the lens module may include an optical element which duplicates the optical signals output by the light emitting element array.

A field of view of the optical signals duplicated and output by the optical element may be greater than a field of view of the optical signals collected and output by the lens module.

The light emitting element array may be divided into a plurality of areas, and the plurality of light emitting elements may be disposed in a partial region of each of the plurality of areas.

The control unit may control the light emitting unit so that some light emitting elements of the light emitting elements, which are disposed in each of the plurality of areas, emit light.

A field of view of the optical signals duplicated and output by the optical element may be smaller than a field of view of the optical signals collected and output by the lens module.

The light emitting element array may be divided into a plurality of areas, and the plurality of light emitting elements may be disposed in an entire region of each of the plurality of areas.

The control unit may control the light emitting unit so that all of the light emitting elements, which are disposed in any one of the plurality of areas, emit light.

The optical element may duplicate the optical signals so that a part of a region of a first optical pattern corresponding to the optical signals, which are output by the light emitting elements arranged in a first area of the plurality of areas, and a part of a region of a second optical pattern corresponding to the optical signals, which are output by the light emitting elements disposed in a second area of the plurality of areas, overlap.

The control unit may control an intensity of the optical signal by controlling an exposure time of the optical signal or power supplied to the light emitting element array.

Advantageous Effects

According to embodiments, a camera device can be flexibly driven according to requirements of various applications by changing an optical pattern of an optical signal according to various variables such as a distance from an object and a resolution.

According to embodiments, power consumption can be reduced.

According to embodiments, a light-saturation phenomenon can be inhibited.

Useful advantages and effects of the present invention are not limited to the above-described contents and will be more easily understood from descriptions of the specific embodiments of the present invention.

MODES OF THE INVENTION

Figure 1:
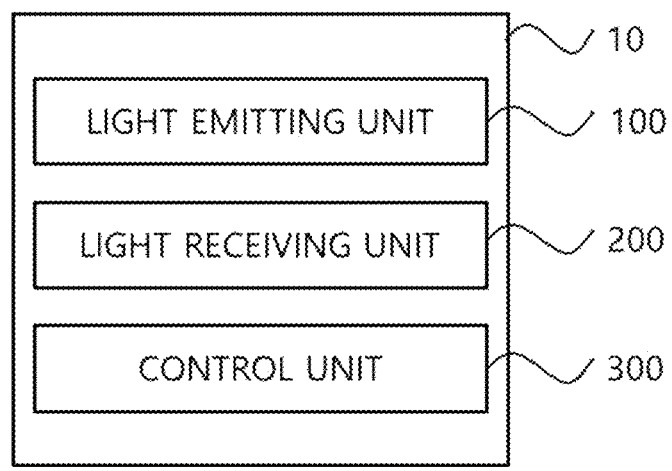
FIG. 1 is a block diagram illustrating a camera module according to an embodiment of the present invention.

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

A camera module 10 according to an embodiment of the present invention may be referred to as a camera device, a time of flight (ToF) camera module 10, a ToF camera device, or the like.

The camera module 10 according to the embodiment of the present invention may be included in an optical device. The optical device may include any one among a mobile phone, a portable phone, a smartphone, a portable smart device, a digital camera, a laptop computer, a digital broadcasting terminal, a personal digital assistant (PDA), a portable multimedia player (PMP), and a navigation device. However, a kind of the optical device is not limited thereto, and any device for capturing an image or taking a picture may be included in the optical device.

Hereinafter, a structure of the ToF camera device according to the present embodiment will be described with reference to the accompanying drawings.

FIG. 1 is a block diagram illustrating the camera module according to the embodiment of the present invention.

Referring to FIG. 1, the camera module 10 according to the embodiment of the present invention may include a light emitting unit 100, a light receiving unit 200, and a control unit 300.

The camera module 10 may include the light emitting unit 100. The light emitting unit 100 may be a light emitting module, a light emitting unit, a light emitting assembly, or a light emitting device. The light emitting unit 100 may generate an optical signal and emit the optical signal to an object. In this case, the light emitting unit 100 may generate and output an output optical signal in the form of a pulse wave or continuous wave. The continuous wave may have the form of a sinusoid wave or squared wave. In the present specification, the optical signal output from the light emitting unit 100 may be an optical signal incident on the object. The optical signal output from the light emitting unit 100 may be referred to as output light, an output optical signal, or the like from a viewpoint of the camera module 10. The light output from the light emitting unit 100 may be referred to as incident light, an incident optical signal, or the like from a viewpoint of the object.

The optical signal generated by the light emitting unit 100 is emitted to the object for a predetermined integration time. In this case, the integration time means one frame cycle. In order to generate a plurality of frames, the preset integration time is repeated. For example, when the ToF camera device captures images of the object at 20 frames per second (FPS), the integration time is $\frac{1}{20}$ sec. In addition, in order to generate 100 frames, the integration time may be repeated 100 times.

The light emitting unit 100 may output a plurality of optical signals having different frequencies. The light emitting unit 100 may sequentially and repeatedly generate a plurality of optical signals having different frequencies. Alternatively, the light emitting unit 100 may also output a plurality of optical signals having different frequencies at the same time.

The light emitting unit 100 may output optical signals according to a plurality of optical patterns. The light emitting unit 100 may output the optical signals according to any one optical pattern of the plurality of optical patterns. According to a first embodiment, a light emitting unit 100 may change an optical pattern by changing optical paths of optical signals. According to a second embodiment, a light emitting unit 100 may change an optical pattern by controlling driving of a plurality of light emitting elements. According to a third embodiment, a light emitting unit 100 may change an optical pattern by changing an exposure time of an optical signal or power supplied to a light emitting element according to modulation control of a control unit 300. The camera module 10 according to the embodiment of the present invention may be implemented through each of the first to third embodiments or implemented by combining at least two embodiments.

The camera module 10 may include the light receiving unit 200. The light receiving unit 200 may be a light receiving module, a light receiving unit, a light receiving assembly, or a light receiving device. The light receiving unit 200 may detect a reflected optical signal output from the light emitting unit 100 and reflected by the object. The light receiving unit 200 may be disposed parallel to the light emitting unit 100. The light receiving unit 200 may be disposed beside the light emitting unit 100. The light receiving unit 200 may be disposed in the same direction as the light emitting unit 100. The light receiving unit 200 may include a lens assembly, a filer, and a sensor.

The light receiving unit 200 may include the lens assembly. An optical signal reflected by the object may pass through the lens assembly. An optical axis of the lens assembly may be aligned with an optical axis of the sensor. The lens assembly may be tilted or shifted. The lens assembly may adjust an optical path. The lens assembly may change a path of light incident on the sensor by adjusting the optical path. The lens assembly may change an angle of a field of view (FOV) or a direction of the FOV of the incident light.

The light receiving unit 200 may include the filter. The filter may be disposed between the lens assembly and the sensor. The filter may be disposed on an optical path between the object and the sensor. The filter may filter light in a predetermined wavelength range. The filter may allow reflected light in a specific wavelength band to pass therethrough. The filter may allow light with a specific wavelength to pass therethrough. That is, the filter may reflect or absorb and block light excluding the light with the specific wavelength. The filter may allow infrared light to pass therethrough and may block light with a wavelength other than the infrared light. Alternatively, the filter may allow visible light to pass therethrough and block light with a wavelength other than the visible light. The filter may be moved. The filter may be moved or tilted to adjust an optical path. The filter may be moved to change a path of light incident on the sensor. The filter may change an angle of an FOV or direction of the FOV, or the like of incident light.

The camera module 10 may include the sensor. The sensor may detect light. The sensor may receive reflected light. The sensor may be an image sensor configured to detect light. The sensor may detect the light and output an electric signal. The sensor may detect light with a wavelength corresponding to a wavelength of light output from the light emitting element. The sensor may detect infrared light. Alternatively, the sensor 30 may detect visible light. The sensor may include a pixel array configured to receive light passing through the lens assembly and convert the light into an electric signal corresponding to the light, a driving circuit configured to drive a plurality of pixels included in the pixel array, and a readout circuit configured to read analog pixel signals of the pixels. The readout circuit may compare the analog pixel signal with a reference signal to perform analog-digital conversion so as to generate digital pixel signals (image signals). In this case, the digital pixel signals of the pixels included in the pixel array constitute the image signals, and since the image signals are transmitted in units of frames, the image signals may be defined as an image frame. That is, the image sensor may output a plurality of image frames.

The control unit 300 may control the light emitting unit 100 to output optical signals according to one optical pattern of a plurality of optical patterns. The control unit 300 may control the light emitting element to be turned on or off so that the light emitting element is controlled to generate an optical signal in the form of a continuous wave or pulse wave. The control unit 300 may control the light emitting unit 100 to generate an optical signal in the form of a continuous wave or pulse wave through frequency modulation, pulse modulation, or the like. In addition, the control unit 300 may control power supplied to the light emitting unit 100. The control unit 300 may control the light emitting unit so that optical signals selectively have one optical pattern among a surface light pattern and a point light pattern.

The camera module 10 may further include an image processing unit (not shown). As one example, the image processing unit may be included in the sensor. As another example, the image processor may be included in a terminal to which the camera module 10 is coupled. For example, the image processing unit may be included in an application processor (AP). The image processing unit may include an image processor which receives an image signal from the sensor and processes (for example, performs interpolation, frame synthesizing, and the like on) the image signal. Particularly, the image processing unit may use image signals (low-resolution) of a plurality of frames to synthesize into image signals (high-resolution) of one frame. That is, the image processing unit may use a plurality of image frames included in the image signals received from the sensor and generate a synthesized result as a synthesized image. The synthesized image generated by the image processing unit may have a high-resolution when compared to the plurality of image frames output from the sensor. That is, the image processing unit may generate a high-resolution image through a super resolution (SR) technique.

Figure 2:
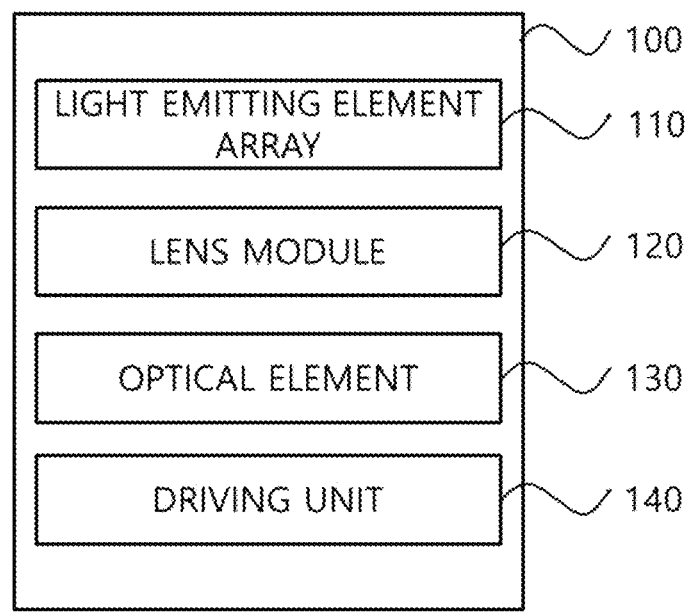
FIG. 2 is a block diagram illustrating a light emitting unit according to the embodiment of the present invention.

FIG. 2 is a block diagram illustrating the light emitting unit according to the embodiment of the present invention.

Referring to FIG. 2, the light emitting unit 100 according to the embodiment of the present invention may include a light emitting element array 110 and a lens module 120 and may further include at least one of a variable lens 130 and a driving unit 140.

The light emitting element array 110 may include a plurality of light emitting elements. In the light emitting element array 110, the plurality of light emitting elements may be disposed according to a predetermined arrangement pattern. The light emitting element may generate light. The light emitting element may output the light. The light emitting element may emit the light. The light generated by the light emitting element may be infrared light with a wavelength of 770 to 3000 nm. Alternatively, the light generated by the light emitting element may be visible light with a wavelength of 380 to 770 nm. The light emitting element may include a vertical cavity surface emitting laser (VCSEL). In addition, the light emitting element may include a light emitting diode (LED). The light emitting element may include a plurality of LEDs arranged in a predetermined pattern. In addition, the light emitting element may include an organic LED (OLED) or laser diode (LD).

The light emitting unit 100 may include the lens module 120. The lens module 120 may allow an optical signal output by the light emitting element array 110 to pass therethrough. The lens module 120 may include a plurality of lenses 121 and an optical element 122.

The plurality of lenses 121 may include a collimator lens. The plurality of lenses 121 may be disposed between the light emitting element array 110 and the optical element 122.

The optical element 122 may duplicate an optical signal output by the lens module 120 according to a preset duplication pattern. The optical element 122 may be a diffractive optical element (DOE) or a diffuser lens. The optical element 122 may be an element formed with micro scale or nano scale concave-convex structures. The DOE may convert an optical signal into an optical signal having a wave front having a preset shape by modulating a phase and an amplitude of the optical signal input to a structure having a concave-convex shaped surface. The optical signal, of which the wave front is modulated by the optical element 122, may pass through a space or medium according to the laws of wave diffraction.

The variable lens 130 may change an optical path of an optical signal. The variable lens 130 may be disposed under the lens module 120, between the plurality of lenses 121 and the optical element 122, or between the plurality of lenses 121. As the variable lens 130 changes the optical path of the optical signal, an optical pattern of optical signals output by the light emitting unit 100 may be a surface light pattern or point light pattern. The surface light pattern may be a light pattern in which a plurality of pieces of collected point light are diffused (scattered). The variable lens 130 may be a liquid lens. The liquid lens may include two liquids (for example, a conductive liquid and a non-conductive liquid) having different properties. An interface may be formed between two liquids. A curve and inclination of the interface is changed according to a voltage applied to the liquid lens so that the optical path of the optical signal may be changed.

The driving unit 140 may move the lens module 120. An optical path of an optical signal passing through the lens module 120 moved by the driving unit 140 may be changed. When a distance between the lens module 120 moved by the driving unit 140 and the light emitting element array 110 increases, optical signals output by the light emitting unit 100 may be output according to a surface light pattern. When the distance between the lens module 120 moved by the driving unit 140 and the light emitting element array 110 decreases, the optical signals output by the light emitting unit 100 may be output according to a point light pattern. The driving unit 140 may be a voice coil motor (VCM).

Figure 3:
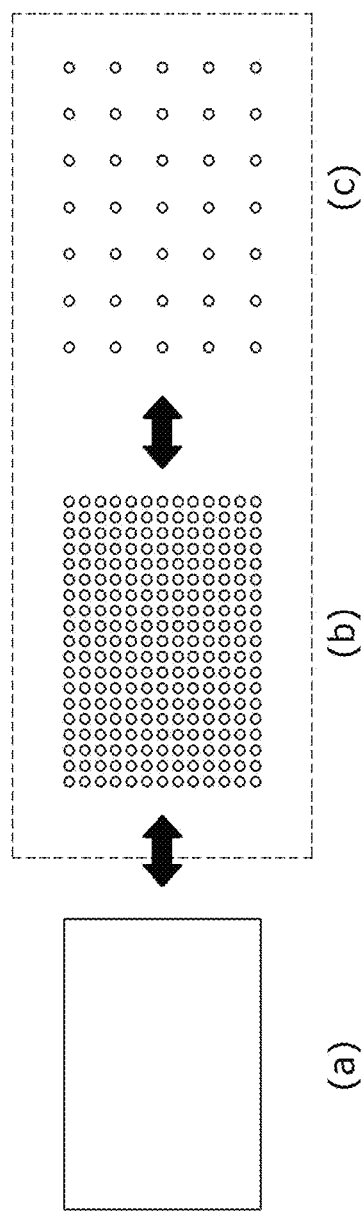
FIGS. 3 and 4 are views for describing an optical pattern of an optical signal according to a change in optical path according to a first embodiment of the present invention.
Figure 4:
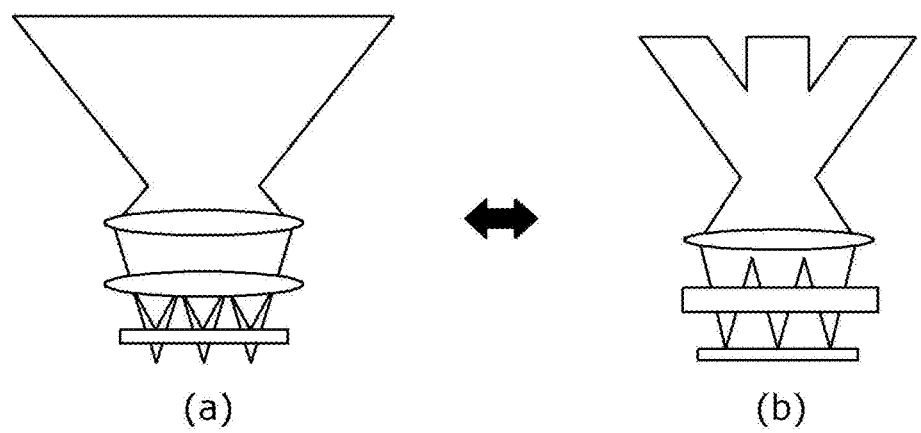

FIGS. 3 and 4 are views for describing an optical pattern of an optical signal according to a change in optical path according to the first embodiment of the present invention.

Referring to FIG. 3, in the camera module 10 according to the embodiment of the present invention, an optical pattern may be changed according to optical paths of output optical signals. As an example, when the light emitting unit 100 includes the variable lens 130, optical signals may be output to have a surface light pattern or a point light pattern as a curvature of the variable lens 130 is changed. For example, when the curvature of the variable lens 130 has a predetermined size or more, the optical signals may be output to have the surface light pattern as in FIGS. 3A and 4A. Conversely, when the curvature of the variable lens 130 has the predetermined size or less, the optical signals may be output to have the point light pattern as in FIGS. 3B, 3C, and 4B. As the size of the curvature decreases from the predetermined size or less of the curvature, a resolution of a point light pattern may decrease from a resolution as in FIG. 3B to a resolution as in FIG. 3C. In this case, the meaning of "resolution decreases" may be that a distance between dots included in the point light pattern increases. Since a distance between dots in the point light pattern illustrated in FIG. 3B is smaller than a distance between dots in the point light pattern illustrated in FIG. 3C, a resolution of the point light pattern of FIG. 3C may be lower than a resolution of the point light pattern of FIG. 3B.

As another example, when the light emitting unit 100 includes the driving unit 140, optical signals may be output to have a surface light pattern or point light pattern according to a distance between the light emitting element array 110 and the lens module 120. For example, when the distance between the light emitting element array 110 and the lens module 120 is smaller than or equal to a predetermined distance, the optical signals may be output to have the surface light pattern as in FIGS. 3A and 4A. Conversely, when the distance between the light emitting element array 110 and the lens module 120 is a predetermined distance or more, the optical signals may be output to have the point light pattern as in FIGS. 3B, 3C, and 4B. Within the predetermined distance or more, as the distance between the light emitting element array 110 and the lens module 120 increases, a resolution of a point light pattern may be lowered from a resolution as in FIG. 3B to a resolution as in FIG. 3C.

As still another example, the camera module 10 according to the present invention may be implemented with both of the variable lens 130 and the driving unit 140. The light emitting unit 100 may output optical signals of which an optical pattern is changed as a distance between the light emitting element array 110 and the lens module 120 is changed as described above by the curvature of the variable lens 130 and the driving unit 140.

In the camera module 10 according to the embodiment of the present invention, since an optical pattern of an output light may be changed to the point light pattern from the surface light pattern, or a resolution of the point light pattern may be changed, according to a resolution of an output light, a distance from the object, an amount of power consumption, and the like, there is an advantage of flexibly responding requirements of various applications.

FIGS. 5 to 8 are views for describing a structure of the light receiving unit according to the first embodiment of the present invention.

Figure 5:
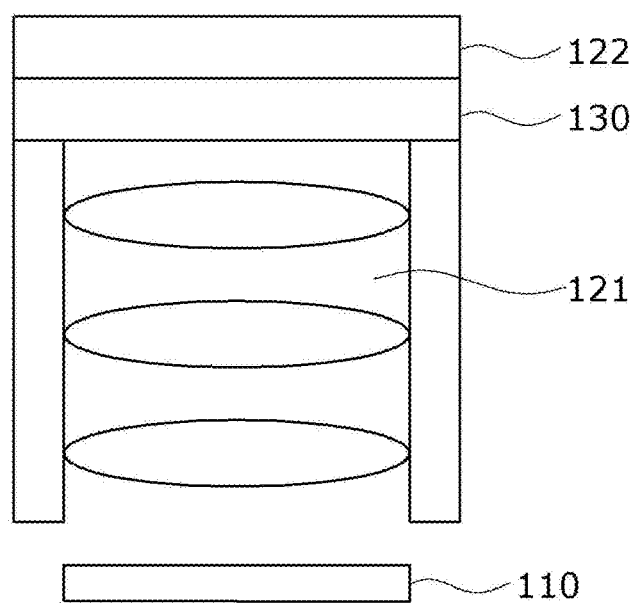
FIGS. 5 to 8 are views for describing a structure of a light receiving unit according to the first embodiment of the present invention.
Figure 6:
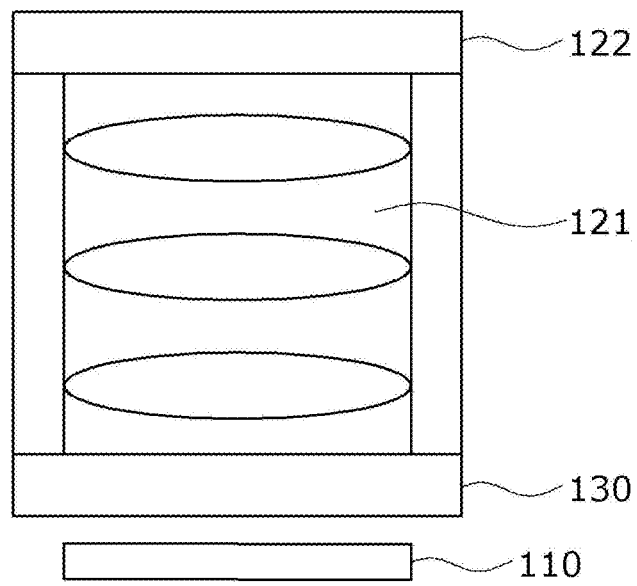
Figure 7:
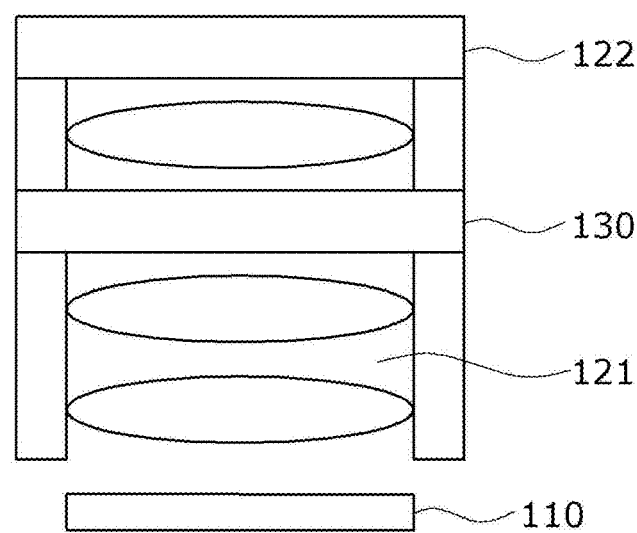

FIGS. 5 to 7 show the embodiment in which the light receiving unit 200 further includes the variable lens 130.

FIG. 5 shows the embodiment in which the variable lens 130 is disposed between the plurality of lenses 121 and the optical element 122.

Referring to FIG. 5, the light receiving unit 200 may include the light emitting element array 110, the lens module 120 including the plurality of lenses 121 and the optical element 122, and the variable lens 130. In the light receiving unit 200, the light emitting element array 110, the plurality of lenses 121, the variable lens 130, and the optical element 122 may be sequentially disposed. Accordingly, after an optical signal output by the light emitting element array 110 passes through the plurality of lenses 121, an optical path of the optical signal may be changed by the variable lens 130. In addition, the optical signal, of which the optical path is changed by the variable lens 130, may be duplicated by the optical element 122 and output to the object.

FIG. 6 shows the embodiment in which the variable lens 130 is disposed under the lens module 120. Referring to FIG. 6, the light receiving unit 200 may include the light emitting element array 110, the lens module 120 including the plurality of lenses 121 and the optical element 122, and the variable lens 130. In the light receiving unit 200, the light emitting element array 110, the variable lens 130, the plurality of lenses 121, and the optical element 122 may be sequentially disposed. That is, the variable lens 130 may be disposed between the light emitting element array 110 and the lens module 120. Accordingly, an optical path of an optical signal output by the light emitting element array 110 may be changed by the variable lens 130. In addition, after the optical signal, of which the optical path is changed by the variable lens 130, is collected by the lens module 120, the optical signal may be duplicated by the optical element 122 and output to the object.

FIG. 7 shows the embodiment in which the variable lens 130 is disposed between the plurality of lenses 121. Referring to FIG. 7, the light receiving unit 200 may include the light emitting element array 110, the lens module 120 including the plurality of lenses 121 and the optical element 122, and the variable lens 130. In the light receiving unit 200, the light emitting element array 110, some of the plurality of lenses 121, the variable lens 130, the other plurality of lenses 121, and the optical element 122 may be sequentially disposed. Accordingly, after optical signals output by the light emitting element array 110 are primarily collected through the plurality of lenses 121, optical paths may be changed by the variable lens 130. In addition, after the optical signals, of which the optical paths are changed by the variable lens 130, are secondarily collected by the plurality of lenses 121, the optical signals may be duplicated by the optical element 122 and output to the object.

Figure 8:
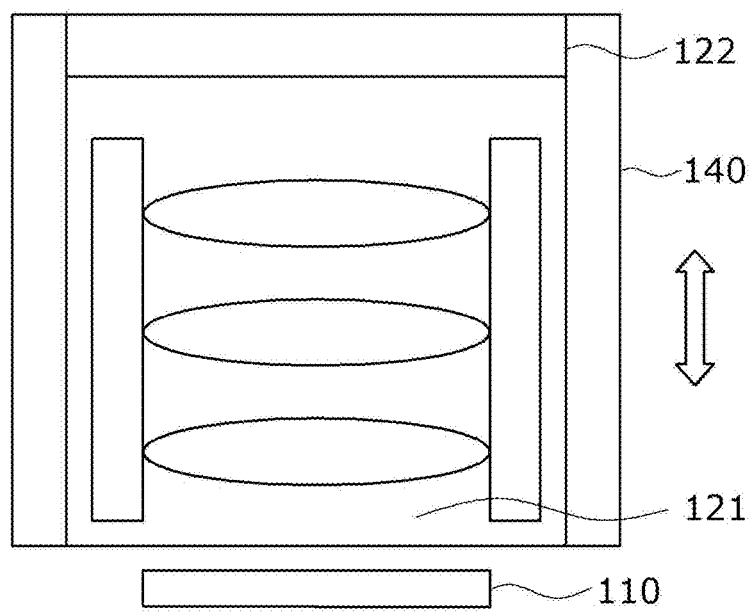

FIG. 8 shows the embodiment in which the light receiving unit 200 further includes the driving unit 140.

Referring to FIG. 8, the light receiving unit 200 may include the light emitting element array 110, the lens module 120, optical element 122, and the driving unit 140. In the light receiving unit 200, the light emitting element array 110, the lens module 120, and the optical element 122 may be sequentially disposed. The driving unit 140 may be disposed to be coupled to the lens module 120. As a distance between the lens module 120 and the light emitting element array 110 is changed by the driving unit 140, an optical pattern of optical signals output by the light emitting unit 100 may be changed. Specifically, when the distance between the light emitting element array 100 and the lens module 120 decreases, the light emitting unit 100 may output optical signals having a surface light pattern. When the distance between the light emitting element array 100 and the lens module 120 increases, the light emitting unit 100 may output the optical signals having a surface light pattern. As an example, when the distance between the light emitting element array 100 and the lens module 120 has a first distance value, the light emitting unit 100 may output optical signals having a point light pattern. When the distance between the light emitting element array 100 and the lens module 120 has a second distance value greater than the first distance value, the light emitting unit 100 may output the optical signals having the surface light pattern. As another example, when the distance between the light emitting element array 100 and the lens module 120 has a third distance value between the first distance value and the second distance value, the light emitting unit 100 may output the optical signals having a point light pattern of which a distance between dots is smaller than a distance between dots of the point light pattern output according to the second distance value.

Figure 9A:
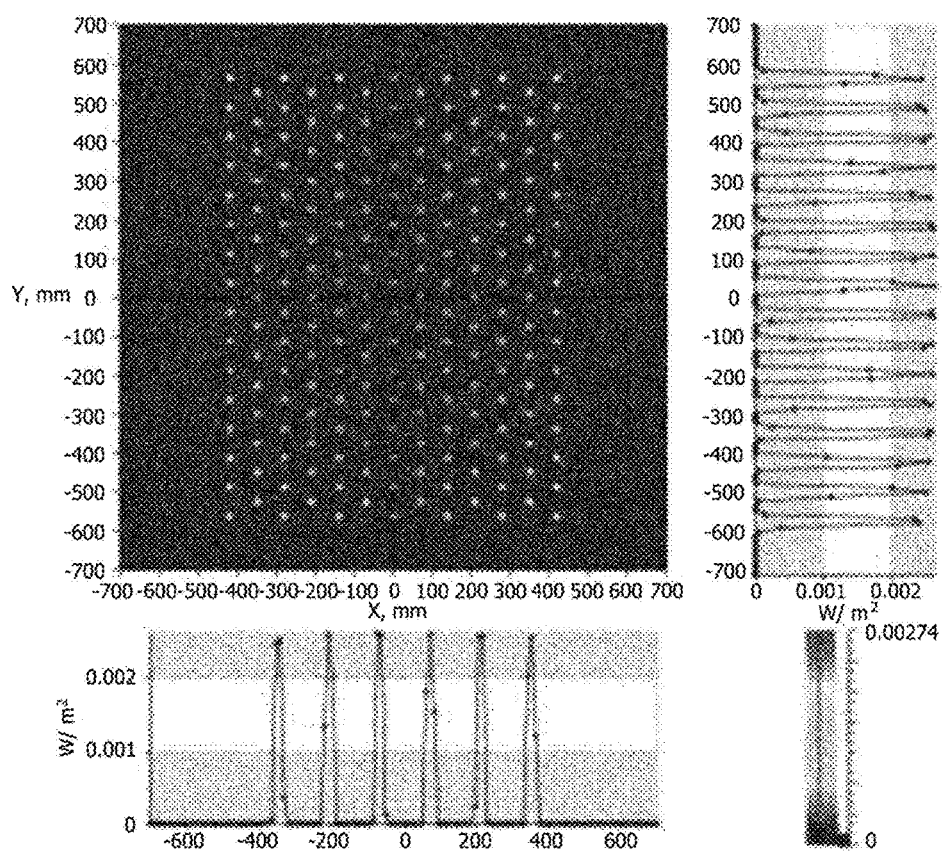
FIGS. 9A and 9B show simulation results of an optical pattern according to a change in optical path according to an embodiment of the present invention.
Figure 9B:
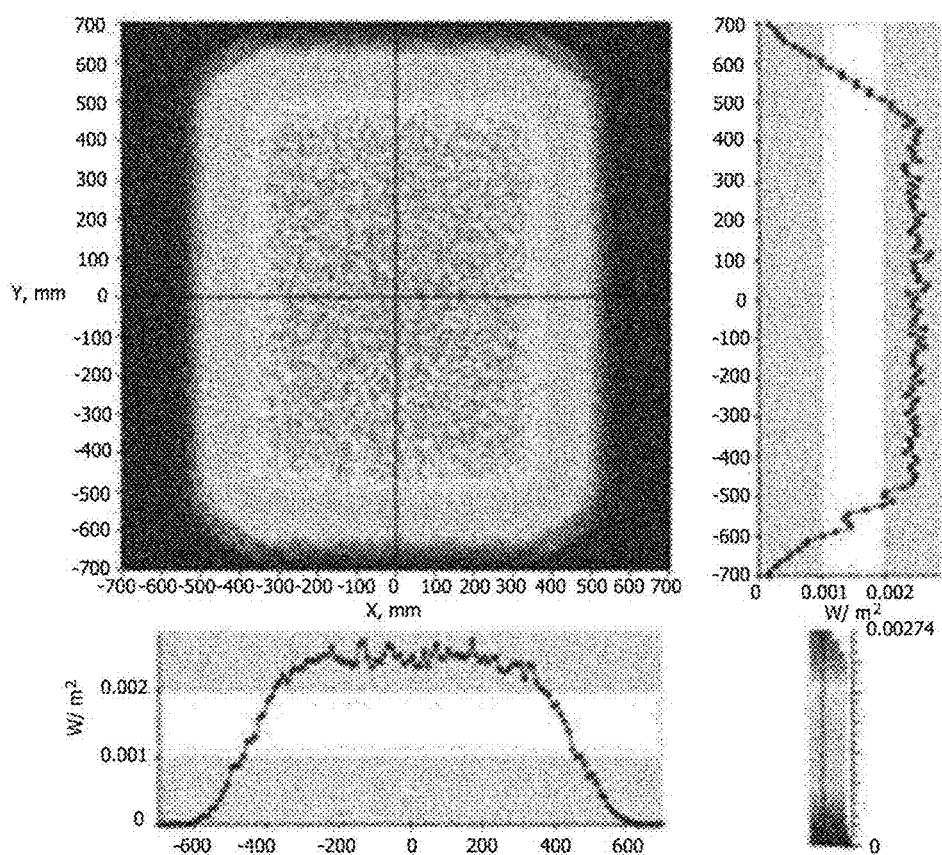

FIGS. 9A and 9B show simulation results of an optical pattern according to a change in optical path according to the embodiment of the present invention.

As illustrated in FIGS. 9A and 9B, it may be seen that optical signals may be output to the object according to a point light pattern or a surface light pattern as optical paths of the optical signals are changed by the variable lens 130 or the driving unit 140.

Figure 10:
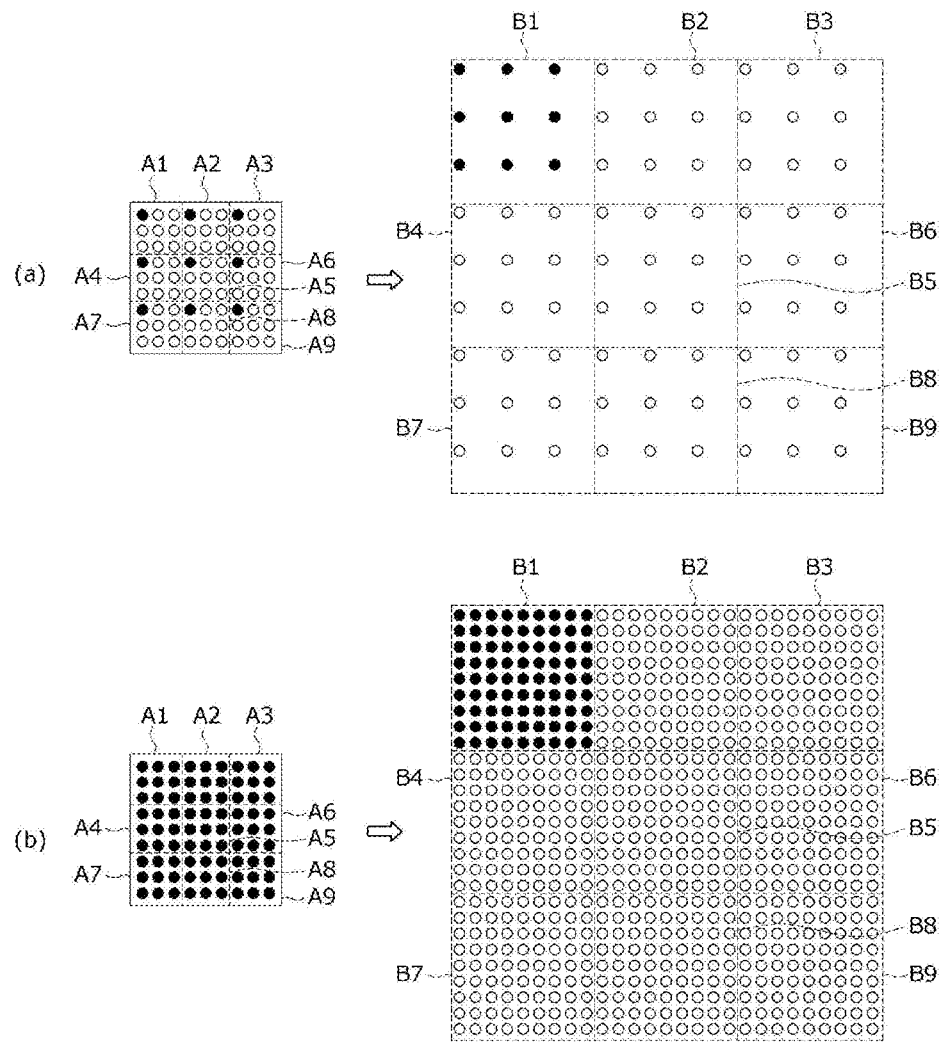
FIGS. 10 to 12 are views for describing a change in optical pattern according to partial driving of light emitting elements according to a second embodiment of the present invention.
Figure 11:
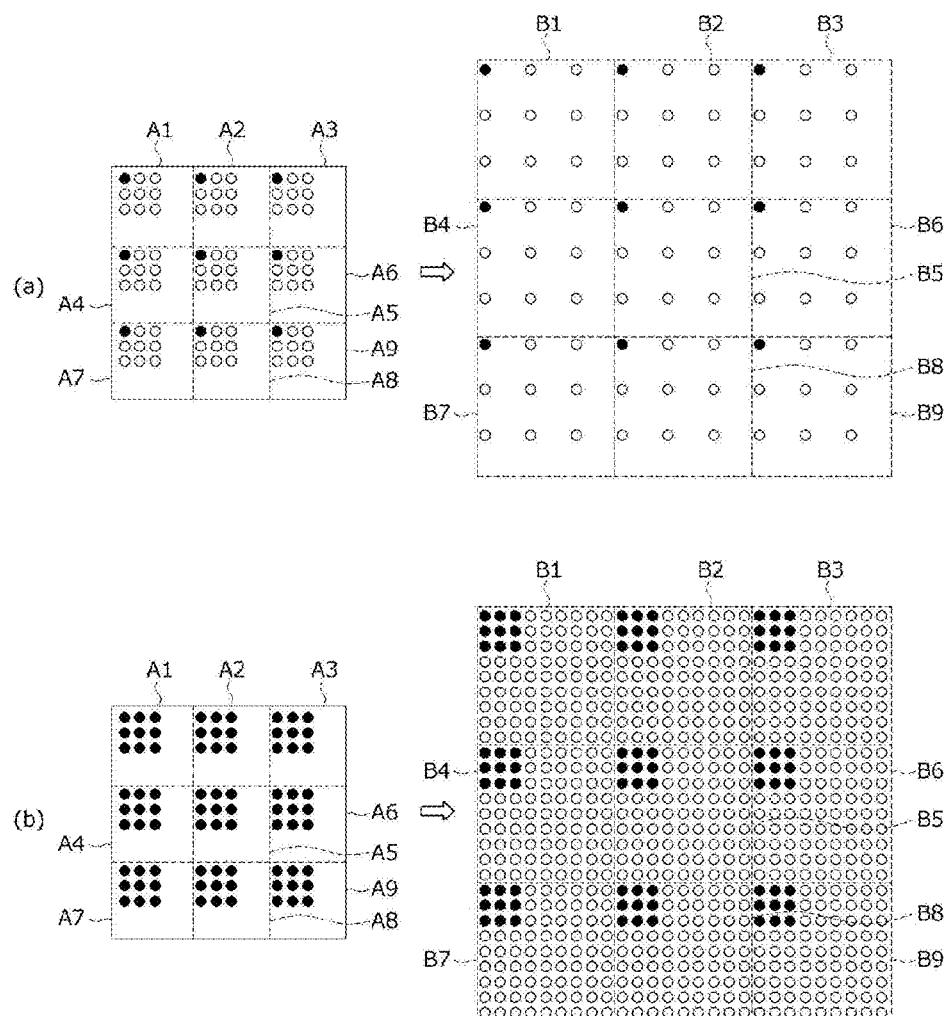
Figure 12:
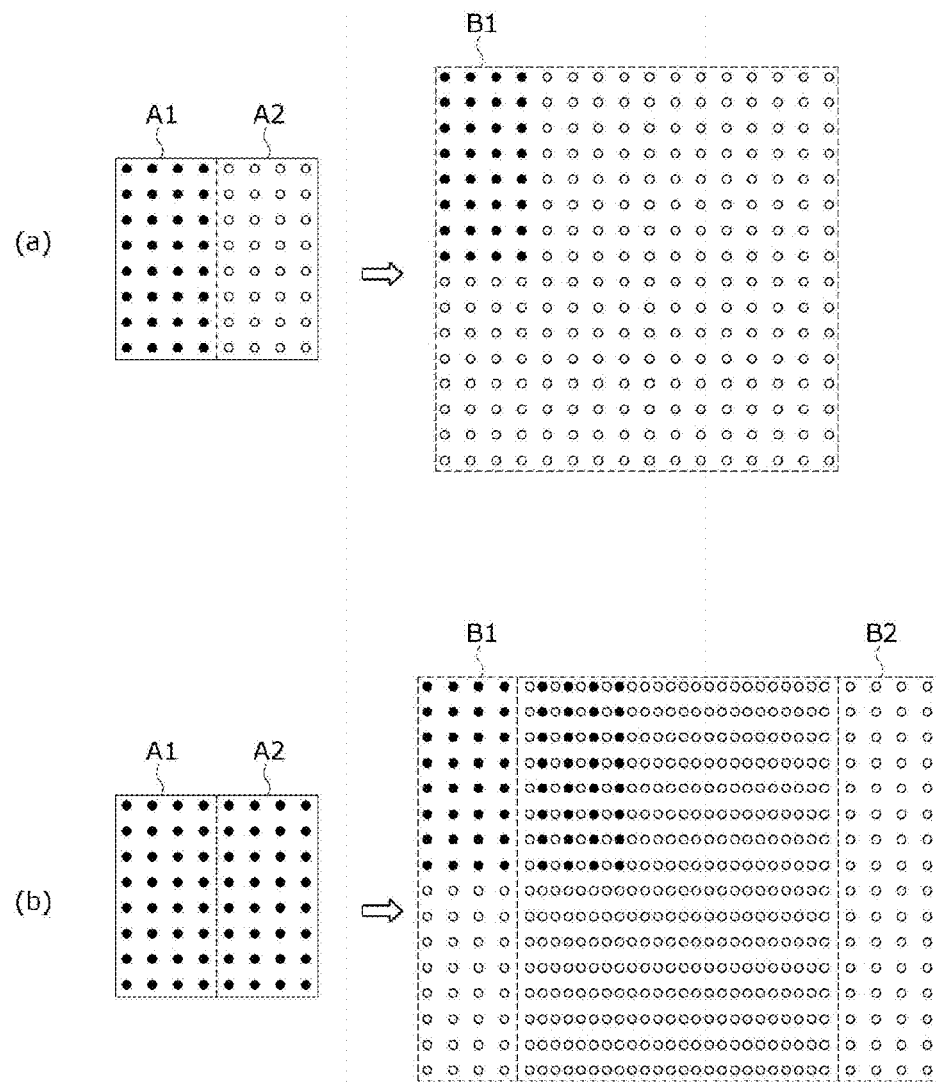

FIGS. 10 to 12 are views for describing a change in optical pattern according to partial driving of light emitting elements according to the second embodiment of the present invention.

FIG. 10 shows an example of an optical pattern according to partial driving of the light emitting elements.

The drawings illustrated at left sides in FIGS. 10A and 10B show the light emitting element array 110, and the drawings illustrated at right sides therein show optical patterns of optical signals output to the object.

Referring to FIG. 10, in the light emitting element array 110 according to one embodiment of the present invention, the plurality of light emitting elements may be disposed at the same intervals. In this case, an FOV of optical signals output by the plurality of lenses 121 may be smaller than an FOV of optical signals which are duplicated and output by the optical element 122. In FIG. 10, the FOV of the optical signals output by the plurality of lenses 121 may correspond to a region B1. That is, when the optical signals generated by the light emitting elements in areas A1 to A9 are collected and output by the plurality of lenses 121, the optical signals may be emitted to an area corresponding to the region B1 of the object. Conversely, an FOV of optical signals which are duplicated and output by the optical element 122 may correspond to regions B2 to B9. For example, optical signals output from the area A1 may be duplicated and emitted to areas corresponding the regions B2 to B9 of the object.

The control unit 300 may control some of the plurality of light emitting elements to emit light or control all of the plurality of light emitting elements to emit light. As an example, as illustrated in FIG. 10A, the control unit 300 may control the light emitting unit 100 so that the light emitting elements disposed to be spaced apart from each other at preset intervals among the plurality of light emitting elements. As another example, as illustrated in FIG. 10B, the control unit 300 may control the light emitting unit 100 so that all of the plurality of light emitting elements emit light. As described above, a resolution of an optical pattern emitted to the object may be controlled by partially driving the light emitting elements.

FIG. 11 shows another example of an optical pattern according to partial driving of the light emitting elements.

The drawings illustrated at left sides in FIGS. 10A and 10B show the light emitting element array 110, and the drawings illustrated at right sides therein show optical patterns of optical signals output to the object.

Referring to FIG. 11, the light emitting element array 110 according to one embodiment of the present invention is divided into a plurality of areas, and a plurality of light emitting elements may be disposed in each of the plurality of areas. For example, the light emitting element array 110 may be divided into areas A1 to A9, and nine light emitting elements may be disposed at a left upper end of each of the areas A1 to A9. That is, the light emitting elements are not disposed uniformly in the divided in the areas and may be disposed to be concentrated in a predetermined region thereof. In this case, an FOV of optical signals output by the plurality of lenses 121 may be greater than an FOV of optical signals which are duplicated and output by the optical element 122. In FIG. 11, the FOV of the optical signals output by the plurality of lenses 121 may correspond to regions B1 to B9. That is, when the lens module 120 collects and outputs the optical signals generated by the light emitting elements in the areas A1 to A9, the optical signals may be emitted to areas corresponding to the regions B1 to B9 of the object. Conversely, an FOV of optical signals duplicated and output by the optical element 122 may correspond to any one of the regions B1 to B9. For example, optical signals output from the area A1 may be duplicated and emitted to an area corresponding to the region B1 of the object. Optical signals output from the area A2 may be duplicated and emitted to an area corresponding to a region B2 of the object.

The control unit 300 may control some of the plurality of light emitting elements to emit light or control all of the plurality of light emitting elements to emit light. As an example, as illustrated in FIG. 11A, the control unit 300 may control the light emitting unit 100 so that some of the light emitting elements disposed in each area of the plurality of areas emit light. As another example, as illustrated in FIG. 10B, the control unit 300 may control the light emitting unit 100 so that all of the plurality of light emitting elements emit light. As described above, a resolution of an optical pattern emitted to the object may be controlled by partially driving the light emitting elements.

FIG. 12 shows another example of an optical pattern according to partial driving of the light emitting elements.

The drawings illustrated at left sides in FIGS. 12A and 12B show the light emitting element array 110, and the drawings illustrated at right sides therein show optical patterns of optical signals output to the object.

Referring to FIG. 12, the light emitting element array 110 according to one embodiment of the present invention is divided into a plurality of areas, and a plurality of light emitting elements may be disposed in each of the plurality of areas. In this case, the optical element 122 may be provided as a plurality of optical elements 122. Parts of optical patterns output by the plurality of optical elements 122 may overlap. For example, the optical elements 122 may include a first optical element, which duplicates optical signals output by the light emitting elements disposed in a first area, and a second optical element, which duplicates optical signals output by the light emitting elements disposed in a second area, among a plurality of areas. A partial region of a first optical pattern output by the first optical element and a partial region of a second optical pattern output by the second optical element may overlap.

For example, as illustrated in FIG. 12A, when the light emitting elements disposed in an area A1 emit light, the first optical element may duplicate optical signals output by the plurality of lenses 121 and output optical signals having an optical pattern as in a region B1. Conversely, as illustrated in FIG. 12B, when the light emitting elements disposed in areas A1 and A2 emit light, the first optical element may duplicate optical signals, which are output by the plurality of lenses 121 and correspond to the area A1, and output optical signals having a first optical pattern as in a region B1, and the second optical element may duplicate optical signals, which are output by the plurality of lenses 121 and correspond to the area A2, and output optical signals having a second optical pattern as in a region B2. In this case, a partial region of the first optical pattern and a partial region of the second optical pattern may overlap. In the overlapping region, an optical pattern having a resolution, which is higher than a resolution of the first optical pattern and a resolution of the second optical pattern, may be formed. Meanwhile, an FOV of the optical signals output by the plurality of lenses 121 may be smaller than an FOV of the optical signals duplicated and output by the first optical element and the second optical element.

Figure 13:
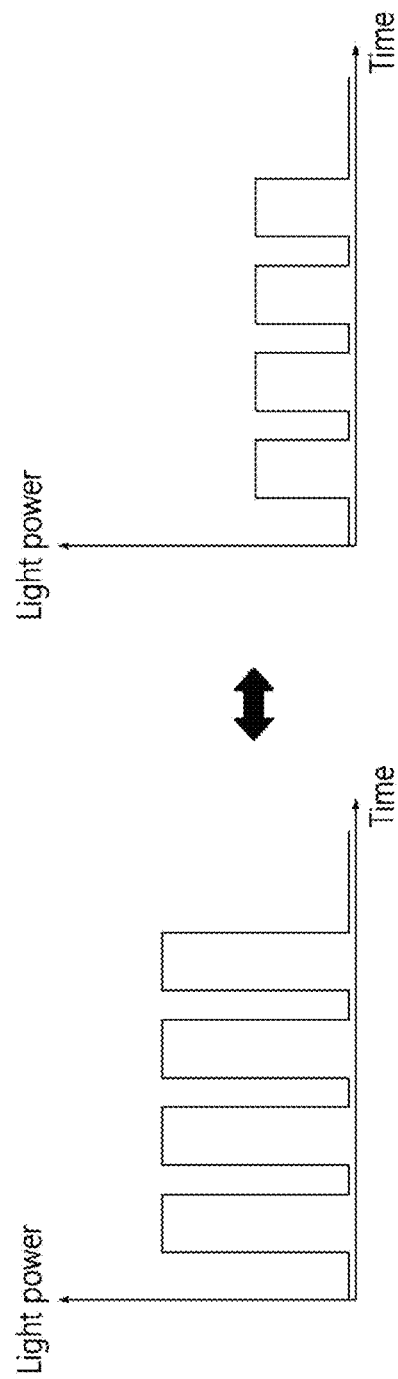
FIGS. 13 and 14 are views for describing a change in optical pattern according to a third embodiment of the present invention.
Figure 14:
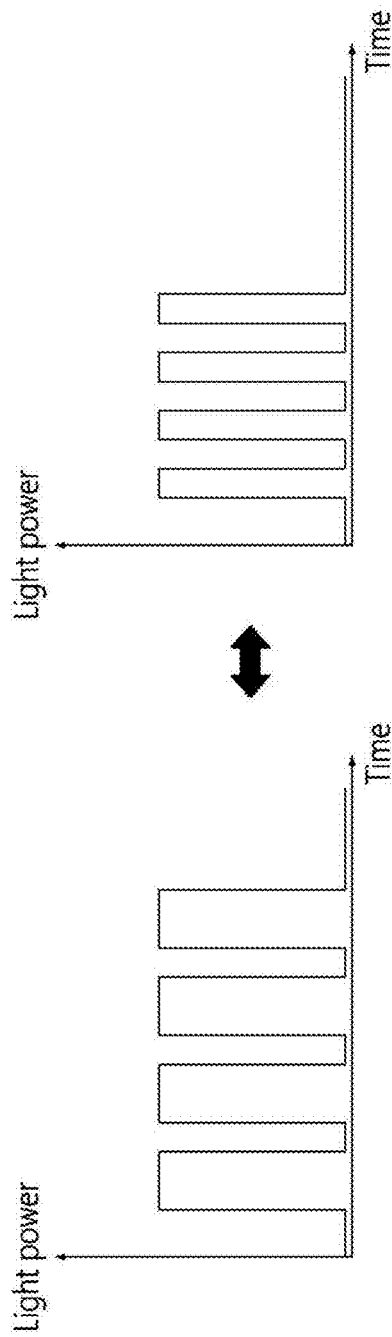

FIGS. 13 and 14 are views for describing a change in optical pattern according to the third embodiment of the present invention.

FIG. 13 shows a process in which an optical pattern is changed by controlling power supplied to the light emitting element. The control unit 300 may control power supplied to the light emitting element array 110 of the light emitting unit 100. The control unit 300 may change an optical pattern of an optical signal output by the light emitting unit 100 by controlling a magnitude of the power supplied to the light emitting element array 110 of the light emitting unit 100. As an example, by controlling a magnitude of power supplied to the light emitting element array to be increased, the light emitting unit 100 may output an optical signal having an optical pattern having a high luminance intensity. Accordingly, the camera module 10 may improve measurement accuracy. As another example, by controlling a magnitude of power supplied to the light emitting element array 110 to be decreased, the light emitting unit 100 may output an optical signal having an optical pattern having a low intensity. Accordingly, power consumption of the camera module 10 can decrease.

FIG. 14 shows a process in which an optical pattern is changed by controlling an exposure time of an optical signal. The control unit 300 may change an optical pattern of an optical signal output by the light emitting unit 100 by controlling an exposure time of the optical signal output by the light emitting unit 100. As an example, by controlling an exposure time of an optical signal to be long within each subframe, the light emitting unit 100 may output an optical signal having an optical pattern having a high intensity. Accordingly, the camera module 10 may improve measurement accuracy. As another example, by controlling an exposure time of an optical signal to be short in each subframe unit, the light emitting unit 100 may output the optical signal having an optical pattern having a low intensity. Accordingly, power consumption of the camera module 10 can decrease.

While the present invention has been mainly described above with reference to the embodiments, it will be understood by those skilled in the art that the present invention is not limited to the embodiments, but the embodiments are only exemplary, and various modifications and applications which are not illustrated above may fall within the range of the present invention without departing from the essential features of the present embodiments. For example, components specifically described in the embodiments may be modified and implemented. In addition, it should be understood that differences related to modifications and applications fall within the scope of the present invention defined by the appended claims.

The invention claimed is:

1. A camera module comprising:
a light emitting unit that outputs optical signals to an object;
a light receiving unit that receives optical signals reflected by the object; and
a control unit that controls the light emitting unit so that the optical signals selectively have one optical pattern of a surface light pattern and a point light pattern,
wherein the light emitting unit includes a light emitting element array in which a plurality of light emitting elements are disposed according to a predetermined arrangement pattern, and a lens module that allows the optical signals output by the light emitting element array to pass therethrough, and
wherein the lens module includes a variable lens that changes an optical path of the optical signals by changing a curvature so that the optical signals selectively have one optical pattern of the surface light pattern and the point light pattern by the control unit.

2. The camera module of claim 1, wherein the light emitting unit changes an optical pattern of the optical signals by changing a distance between the light emitting element array and the lens module.

3. The camera module of claim 1, wherein the control unit drives:
some of the plurality of light emitting elements; or
all of the plurality of light emitting elements.

4. The camera module of claim 1, wherein, in the light emitting element array, the plurality of light emitting elements are disposed to be spaced apart from each other at same intervals.

5. The camera module of claim 4, wherein the control unit controls the light emitting unit so that the light emitting elements, which are disposed to be spaced apart from each other at preset intervals, among the plurality of light emitting elements, emit light.

6. The camera module of claim 1, wherein, in the light emitting unit, the lens module includes an optical element that duplicates the optical signals output by the light emitting element array.

7. The camera module of claim 6, wherein a field of view of the optical signals duplicated and output by the optical element is greater than a field of view of the optical signals collected and output by the lens module.

8. The camera module of claim 1, wherein:
the light emitting element array is divided into a plurality of areas; and
the plurality of light emitting elements are disposed in a partial region of each of the plurality of areas.

9. The camera module of claim 8, wherein the control unit controls the light emitting unit so that some light emitting elements of the light emitting elements, which are disposed in each of the plurality of areas, emit light.

10. The camera module of claim 8, wherein a field of view of the optical signals duplicated and output by the optical element is smaller than a field of view of the optical signals collected and output by the lens module.

11. The camera module of claim 1, wherein:
the light emitting element array is divided into a plurality of areas; and
the plurality of light emitting elements are disposed in an entire region of each of the plurality of areas.

12. The camera module of claim 11, wherein the control unit controls the light emitting unit so that all of the light emitting elements, which are disposed in any one of the plurality of areas, emit light.

13. The camera module of claim 11, wherein the optical element duplicates the optical signals so that a part of a region of a first optical pattern corresponding to the optical signals, which are output by the light emitting elements arranged in a first area of the plurality of areas, and a part of a region of a second optical pattern corresponding to the optical signals, which are output by the light emitting elements disposed in a second area of the plurality of areas, overlap.

14. The camera module of claim 1, wherein the control unit controls an intensity of the optical signal by controlling:
an exposure time of the optical signal; or
power supplied to the light emitting element array.

* * * * *